(12) United States Patent
Huang

(10) Patent No.: US 10,624,027 B2
(45) Date of Patent: Apr. 14, 2020

(54) CALL PROCESSING METHOD AND APPARATUS THEREOF

(71) Applicant: Beijing Zhigu Rui Tuo Tech Co., Ltd., Beijing (CN)

(72) Inventor: Weicai Huang, Beijing (CN)

(73) Assignee: BEIJING ZHIGU RUI TUO TECH CO., LTD., Beijing (CN)

( * ) Notice: Subject to any disclaimer, the term of this patent is extended or adjusted under 35 U.S.C. 154(b) by 155 days.

(21) Appl. No.: 15/218,947

(22) Filed: Jul. 25, 2016

(65) Prior Publication Data
US 2017/0034779 A1 Feb. 2, 2017

(30) Foreign Application Priority Data

Jul. 30, 2015 (CN) .......................... 2015 1 0458622

(51) Int. Cl.
*H04W 52/02* (2009.01)
*H04W 4/70* (2018.01)
*H04L 29/08* (2006.01)

(52) U.S. Cl.
CPC ....... *H04W 52/0212* (2013.01); *H04L 69/325* (2013.01); *H04L 69/329* (2013.01); *H04W 4/70* (2018.02); *H04W 52/0235* (2013.01); *Y02D 70/122* (2018.01); *Y02D 70/142* (2018.01); *Y02D 70/144* (2018.01); *Y02D 70/21* (2018.01); *Y02D 70/23* (2018.01); *Y02D 70/24* (2018.01); *Y02D 70/26* (2018.01)

(58) Field of Classification Search
CPC .......... H04W 52/0212; H04W 52/0235; Y02D 70/21
See application file for complete search history.

(56) References Cited

U.S. PATENT DOCUMENTS

| 6,611,201 B1 * | 8/2003 | Bishop .................... B60R 25/04 340/12.5 |
| 8,305,894 B1 | 11/2012 | Zang et al. |
| 9,769,858 B2 * | 9/2017 | Seymour ............. H04W 76/023 |
| 2006/0087993 A1 * | 4/2006 | Sengupta .............. H04W 68/00 370/310 |
| 2008/0310610 A1 | 12/2008 | Serafat et al. |

(Continued)

FOREIGN PATENT DOCUMENTS

| CN | 1625887 A | 6/2005 |
| CN | 101960897 A | 1/2011 |

*Primary Examiner* — Hashim S Bhatti
(74) *Attorney, Agent, or Firm* — Sheppard Mullin Richter & Hampton LLP

(57) ABSTRACT

Embodiments of the present application provide a call processing method and an apparatus thereof. The method includes: receiving information associated with calling at least one slave device, where the information associated with calling at least one slave device is used to request to wake up the at least one slave device from a sleep state to an active state; and sending an excitation signal to the at least one slave device, where the excitation signal is used to request to wake up the at least one slave device. In the method and apparatus in the embodiments of the present application, a slave device is rendered in a sleep state, and the slave device is activated when the slave device is being called or is going to be called, which can save power consumption caused by unnecessary listening by the slave device.

24 Claims, 4 Drawing Sheets

(56) References Cited

U.S. PATENT DOCUMENTS

| | | | |
|---|---|---|---|
| 2009/0221303 A1* | 9/2009 | Soliman | H04W 52/0274 |
| | | | 455/458 |
| 2012/0115542 A1* | 5/2012 | Griffin | H04W 8/205 |
| | | | 455/552.1 |
| 2013/0088564 A1* | 4/2013 | Hillier | H04L 12/1822 |
| | | | 348/14.08 |
| 2015/0301574 A1* | 10/2015 | Kim | G06F 1/163 |
| | | | 345/156 |
| 2017/0019516 A1* | 1/2017 | Fukuda | H04M 1/576 |
| 2017/0135042 A1* | 5/2017 | Rothschild | H04W 52/0235 |

* cited by examiner

CALL PROCESSING METHOD AND APPARATUS THEREOF

TECHNICAL FIELD

The present application relates to the field of wireless communications technologies, and in particular, to a call processing method and apparatus.

BACKGROUND

As technologies advance and the market becomes mature, smart devices per capita increase continuously, and the number of smart devices coexisting in an environment also grows constantly, where the smart devices include: mobile devices, wearable devices, smart home devices, Machine Type Communication (MTC) devices, and the like. Devices such as a wearable device and an MTC device generally need to transmit only a small amount of data at a relatively low frequency in application, and therefore, generally have a small size and a low battery capacity that limits a continuous working time after the device is charged once. Users hope to extend a battery use time of the wearable device and the MTC device as much as possible, to avoid the inconvenience of charging frequently, especially when there are a large number of devices.

SUMMARY

Accordingly, an objective of embodiments of the present application is to provide a new call answering solution.

To implement the foregoing objective, according to a first aspect of the embodiments of the present application, a call processing method is provided, where the method includes:

receiving information associated with calling at least one slave device, where the information associated with calling at least one slave device is used to request to wake up the at least one slave device from a sleep state to an active state; and sending an excitation signal to the at least one slave device, where the excitation signal is used to request to wake up the at least one slave device.

According to a second aspect of the embodiments of the present application, a call processing method is provided, where the method includes:

receiving an excitation signal, where the excitation signal is sent by a master device in response to reception of information associated with calling a slave device, and the information associated with calling the slave device is used to request to wake up the slave device from a sleep state to an active state; and enabling, in response to the reception of the excitation signal, the slave device to convert from the sleep state to the active state.

According to a third aspect of the present application, a call processing apparatus is provided, where the apparatus includes:

a first receiving module, configured to receive information associated with calling at least one slave device, where the information associated with calling at least one slave device is used to request to wake up the at least one slave device from a sleep state to an active state; and a first sending module, configured to send an excitation signal to the at least one slave device, where the excitation signal is used to wake up the at least one slave device.

According to a fourth aspect of the present application, a call processing apparatus is provided, where the apparatus includes:

a second receiving module, configured to receive an excitation signal, where the excitation signal is sent by a master device in response to reception of information associated with calling a slave device, and the information associated with calling the slave device is used to request to wake up the slave device from a sleep state to an active state; and a state conversion module, configured to enable, in response to the reception of the excitation signal, the slave device to convert from the sleep state to the active state.

According to a fifth aspect of the present application, a call processing apparatus is provided, where the apparatus includes:

a transceiver, configured to receive information associated with calling at least one slave device, where the information associated with calling at least one slave device is used to request to wake up the at least one slave device from a sleep state to an active state; and send an excitation signal to the at least one slave device, where the excitation signal is used to request to wake up the at least one slave device;

a memory, configured to store an instruction;

a processor, configured to execute the instruction stored in the memory, where the instruction enables the processor to execute the following step:

sending, by using the transceiver and in response to that the transceiver receives the information associated with calling at least one slave device, an excitation signal to the at least one slave device.

According to a sixth aspect of the present application, a call processing apparatus is provided, where the apparatus includes:

a transceiver, configured to receive an excitation signal, where the excitation signal is sent by a master device in response to reception of information associated with calling a slave device, and the information associated with calling the slave device is used to request to wake up the slave device from a sleep state to an active state and respond to the reception of the excitation signal; and a memory, configured to store an instruction; and a processor, configured to execute the instruction stored in the memory, where the instruction enables the processor to execute the following step:

enabling, in response to that the transceiver receives the excitation signal, the slave device to wake up from the sleep state to the active state.

In the method and apparatus in the embodiments of the present application, a slave device is rendered in a sleep state, and the slave device is activated when the slave device is being called or is going to be called, which can save power consumption caused by unnecessary listening by the slave device.

DETAILED DESCRIPTION

Figure 1:
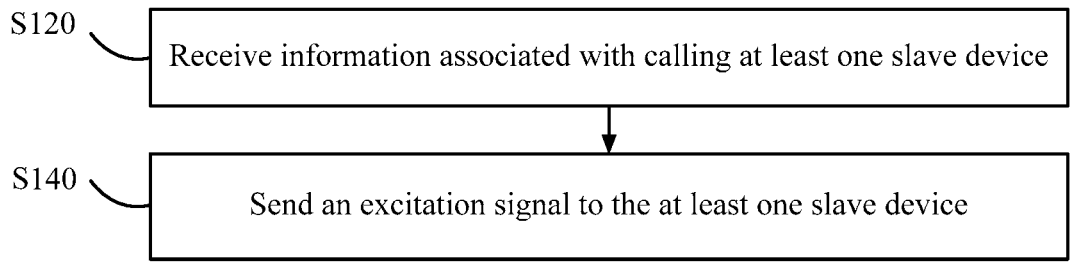
FIG. 1 is a flowchart of an example of a call processing method according to a first embodiment of the present application.

Specific implementation manners of the present invention are described in further detail below with reference to the accompanying drawings and embodiments, and the following embodiments are used to illustrate the present invention, but are not intended to limit the scope of the present invention.

A person skilled in the art may understand that, terms such as "first" and "second" in the present application are only used to distinguish different devices, modules, parameters, or the like, but neither represent any specific technical meaning nor represent any necessary logic sequence between them.

Technical solutions described in the embodiments of the present application may be applied to various wireless communications networks, for example, a Global System for Mobile Communication, a Code Division Multiple Access (CDMA) network, a Time Division Multiple Access (TDMA) network, a Frequency Division Multiple Access (FDMA) network, and an orthogonal FDMA (OFDMA) network. Terms "system" and "network" generally can be exchanged.

In addition, in the embodiments of the present application, a master device may be any user equipment having a wireless communications capability, including, but not limited to: a telephone (such as a cellular phone or a smartphone), a computer (such as a notebook computer), a portable communications device (such as a personal digital assistant), an entertainment device (such as a music or video device, or a satellite radio device), a small station (including a micro base station, a pico cellular base station, a femto cellular base station, or the like), a wireless access point (AP) device, a wireless router, an MTC controller, or any other suitable device configured to perform communication by means of a wireless medium. A slave device may also be any user equipment having a wireless communications capability, for example, a telephone (such as a cellular phone or a smartphone), a wearable device, a smart home device, or an MTC device. The slave device and the master device may be devices of a same type. In the embodiments of the present application, the slave device and the master device are only used to distinguish a device (slave device) that may need to save power consumption and a device (master device) assisting another user equipment in saving power consumption. Moreover, a communication link may be established between the slave device and the master device in a particular communications manner, thereby establishing a master-slave relationship. According to different application scenarios, such particular communications manner may be a short-range wireless communications manner, and in this case, a communication distance allowed by the particular communications manner is used to restrict the master-slave relationship between the master and slave devices. The particular communications manner includes, but is not limited to: Bluetooth, WiFi, and the like. Alternatively, the master-slave relationship between the master and slave devices may be configured and specified in advance. For example, in a home environment, an AP in the home may be specified as the master device, and all other devices accessing a wireless network through the AP may be used as slave devices subordinating to the master device. In the technical solutions of the embodiments of the present application, the master-slave relationship has been established.

FIG. 1 is a flowchart of an example of a call processing method according to a first embodiment of the present application. The method may be executed by any master device. As shown in FIG. 1, the method includes:

S120. Receive information associated with calling at least one slave device, where the information associated with calling at least one slave device is used to request to wake up the at least one slave device from a sleep state to an active state.

The sleep state includes: at least a receiving function of an air interface is disabled. The active state includes: at least the receiving function of the air interface is enabled.

Generally, in either a voice call or a data call, in order to receive a call message in time, the slave device keeps the receiving function of the air interface steady on or periodically enables the receiving function of the air interface to listen to the call message, where the call message includes a paging message (paging) sent by a base station or a core network device. The air interface means an interface for interaction between a called device and a calling device (including: a cellular base station, a WIFI AP, another user equipment, or the like) by means of wireless communications. Disabling/activating a receiving function of an air interface may be embodied as: turning off/on a radio frequency receiving function/state of a transceiver. In the method of this embodiment, to reduce power consumption caused by unnecessary listening by the slave device, the slave device is generally in a sleep state, that is, it is unnecessary to activate the receiving function of the air interface at intervals of a particular time (for example, a paging period). Each master device may establish a master-slave relationship with one or more slave devices in advance, and for a calling device, the master device may be known or unknown. Before or when calling the slave device, a caller device sends information associated with calling at least one slave device to at least the master device corresponding to the slave device or sends information associated with calling at least one slave device in such a manner as the corresponding master device can receive the information associated with calling at least one slave device, to trigger the slave device to convert from the sleep state to the active state. In step S120, the master device receives such information, where such information includes any information used to indicate that the at least one slave device is going to be called, including the call message, which is equivalent to a wakeup request for converting the slave device from the sleep state to the active state, where the wakeup request may include identification information of the corresponding slave device (for example, and ID of the slave device), and the like, and may also include other information associated with calling the slave device, for example, a calling time when the call is going to occur.

S140. Send an excitation signal to the at least one slave device, where the excitation signal is used to request to wake up the at least one slave device.

In the method of this embodiment, in response to the reception of the information associated with calling at least one slave device, an excitation signal is sent to the at least one slave device to wake up the corresponding slave device. According to a signal form acceptable to the slave device in the sleep state, the excitation signal may be a signal of any one or more of the following forms: sound, light, vibration, electric current, radio frequency, and the like.

In conclusion, in the method in this embodiment, a slave device is rendered in a sleep state, and the slave device is activated when the slave device is being called or is going to be called, which can save power consumption caused by unnecessary listening by the slave device.

As described above, the method of this embodiment may be used to activate the slave device when the slave device is being called or is going to be called. The call may include a voice call and may also include a data call. Correspondingly, according to different application scenarios, the information associated with calling at least one slave device may be a layer 3 signaling message (layer 3 message), which is sent by, for example, a base station or a core network device. Generally, the layer 3 signaling message mainly includes: paging, authentication, encryption, channel allocation, switching, measurement reporting, location update, and the like, and in the embodiments of the present application, a layer 3 signaling message used for the activation request above may be defined, or the activation request may be included in an existing layer 3 signaling message of any one of the foregoing functions, for example, included in a paging message. The information associated with calling at least one slave device may also be an application layer message, which may be sent by a server in an IP network or another user equipment that attempts to communicate with the slave device; for example, the application layer message is encapsulated in an IP packet.

In addition, in some cases, although the master-slave relationship is determined, a communication link in the master-slave relationship may have been disrupted, so that the master device can no longer wake up the slave device, where the communication link herein means a communication link that can satisfy transmitting and receiving of the excitation signal. For example, the communication link between the master device and the slave device is disrupted because a relative position relationship between the master device and the slave device changes, and in this case, the slave device is in a state of being unwakeable by the master device. Therefore, in a possible implementation manner, step S140 may further include:

S142. Determine whether the at least one slave device is in a wakeable state.

The wakeable state means a state in which at least the excitation signal sent by the master device can be received in the sleep state.

S144. Send the excitation signal in response to that the at least one slave device is in the wakeable state.

In a possible implementation manner, it may be determined, according to the relative position relationship between the master device and the slave device, whether the slave device is in the wakeable state. In this implementation manner, step S142 may further include:

S1421. Determine a relative position of the at least one slave device.

The relative position means relative positions of the master device and the slave device. The relative position of the at least one slave device may be determined in any manner in which power consumption is lower than power consumption corresponding to a state in which the receiving function of the air interface is active. For example, a position of the slave device is fixed, and the relative positions of the slave device and the master device may be determined by determining a position of the master device.

S1422. Determine, in response to that the at least one slave device is located in a preset area, that the at least one slave device is in the wakeable state.

The preset area may be any suitable area in which the slave device can receive the excitation signal sent by the master device. If the at least one slave device is located in the preset area, it may be considered that the at least one slave device can be waken up by the master device.

In another possible implementation manner, whether a communication link exists between the master device and the slave device may be determined according to a usage state of the slave device. Specifically, the usage state may be: whether the slave device is used by a same user using the master device, and if yes, it may be considered that the slave device can be waken up by the master device. In this implementation manner, step S142 may further include:

S1423. Determine a usage state of the at least one slave device.

Similarly, the usage state of the at least one slave device may be determined in any manner in which power consumption is lower than power consumption corresponding to a state in which the receiving function of the air interface is active. For example, it is determined, according to a driving signal from a possible sensor (for example, a sensor capable of collecting any data that identifies a feature of a user identity) on the slave device or another mechanical mechanism (for example, a wearing mechanism of a wearable device), that the slave device has been worn by a particular user (for example, the user of the master device).

S1424. Determine, according to the usage state, that the at least one slave device is in the wakeable state; and optionally, determine, in response to that the slave device is being used by a user of the master device, that the at least one slave device is in the wakeable state.

In still another possible implementation manner, a low-frequency and/or low-power-consumption communications relationship may be maintained between the master device and the slave device in a preset communications manner, where a clock rate and/or power consumption when the at least one slave device communicates by using the preset communications manner is lower than a clock rate and/or power consumption when the receiving function of the air interface of the at least one slave device is in the active state, and if this communications relationship exists continually, it is considered that the slave device is in the wakeable state; otherwise, the slave device is unwakeable. In this implementation manner, step S142 may further include:

S1425. Determine, in response to that the at least one slave device is capable of communicating by using a preset communications manner, that the at least one slave device is in the wakeable state.

It may be determined at any time, according to whether the master device can receive a reply that is sent by the slave device in the preset communications manner, whether the preset communications manner still exists between the master device and the slave device.

In addition, in the method of this embodiment, the information associated with calling at least one slave device received in step S120 may include time information associated with the call, representing a time at which a caller device calls the at least one slave device.

In this implementation manner, the caller device may call the at least one slave device according to the time, for example, automatically calling the slave device after a period of time, no matter whether the corresponding slave device is waken up or not. In another possible implementation manner, in the method of this embodiment, a corresponding notification message may be sent after the excitation signal is sent or after the slave device is waken up, so that a caller can make a call more efficiently. In this implementation manner, the method of this embodiment further includes:

S160. Send a notification message associated with that the at least one slave device has been waken up.

For example, the notification message may be sent to the caller device or sent to a base station of a cell to which the master device belongs.

In conclusion, the method of this embodiment can avoid unnecessary power consumption of a slave device by means of coordination with a master device.

Figure 2:
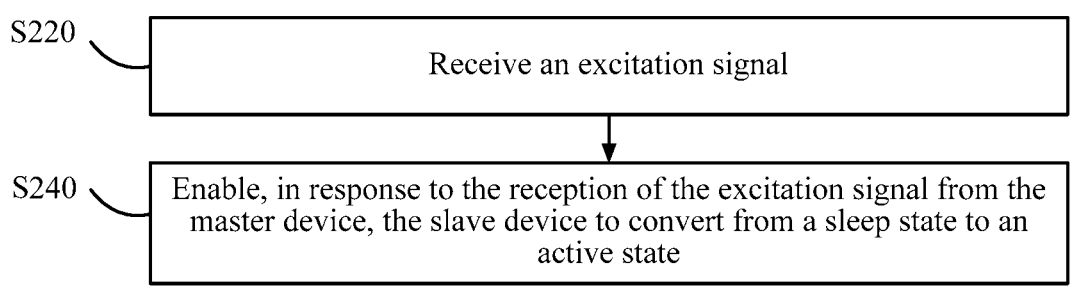
FIG. 2 is a flowchart of an example of a call processing method according to a second embodiment of the present application.

FIG. 2 is a flowchart of a call processing method according to a second embodiment of the present application, where the method may be executed by a slave device or a control apparatus of a slave device. As shown in FIG. 2, the method of this embodiment includes:

S220. Receive an excitation signal, where the excitation signal is sent by a master device in response to reception of information associated with calling a slave device, and the information associated with calling the slave device is used to request to wake up the slave device from a sleep state to an active state.

S240. Convert from the sleep state to the active state in response to the reception of the excitation signal from the master device. Specifically, when the method of this embodiment is executed by the slave device, the slave device converts from the sleep state to the active state in response to the excitation signal, and when the method of this embodiment is executed by the control apparatus of the slave device, the control apparatus controls the slave device to convert from the sleep state to the active state.

The sleep state includes: at least a receiving function of an air interface is disabled. The active state includes: at least the receiving function of the air interface is enabled.

According to the description with reference to FIG. 1, in the embodiments of the present application, the slave device is in the sleep state in a long term, and when needing to call the slave device, a calling device may send, to the master device, information associated with the call, to request to wake up the slave device from the sleep state to the active state. Alternatively, a call message from the calling device to the slave device may also be used to request to wake up the slave device from the sleep state to the active state. The master device sends the excitation signal to the corresponding slave device in response to the reception of the information associated with calling the slave device. The slave device converts from the sleep state to the active state in response to the reception of the excitation signal from the master device.

In conclusion, by means of the method of this embodiment, when the slave device that is in the sleep state in a long term is called or is going to be called, the slave device is waken up by the master device, which can save power consumption caused by unnecessary listening by the slave device.

In the sleep state, a receiving function of an air interface of the slave device is disabled, but the slave device can still perform other operations, and power consumption of the operations performed should be lower than power consumption corresponding to a state in which the receiving function of the air interface is active. A working mode in the sleep state may be referred to as a low power consumption mode. For example, a high-level generating circuit may be designed to generate a high level when excited by an external excitation signal, to trigger the slave device to switch from the low power consumption mode to a normal working mode (the active state). In a possible implementation manner, the high level generating circuit includes a module, such as a series resistor and an acoustic sensor, whose electrical feature can be controlled by an external signal; in a normal situation, the module is in a high-resistance state, no current passes through the module, and the module does not consume power. When excited by a sound at a particular frequency, the acoustic sensor is in a low-resistance state, an electric current passes through the acoustic sensor, and a certain level difference can be generated on a resistor in series, where the level difference is used as a high level signal. The circuit may further include a passive frequency filter, which allows only a sound signal in a particular frequency range to pass, thereby reducing false triggering. The slave device may include an acoustic sensor, and according to different forms of the excitation signal, the slave device may further include other sensors excited by signals such as an optical signal, an electric current signal, a magnetic field signal, and a radio frequency signal. When waking up the save device, the master device sends an excitation signal that meets a particular feature (for example, a particular frequency and particular duration), so that the slave device switches from the sleep state to the active state.

Still according to the description with reference to FIG. 1, the method of this embodiment may be used to activate the slave device when the slave device is being called or is going to be called. The call may include a voice call, and may also include a data call. Correspondingly, in a possible application scenario, the information associated with calling at least one slave device may be a layer 3 signaling message, which is sent by, for example, a base station or a core network device. Generally, the layer 3 signaling message mainly includes: paging, authentication, encryption, channel allocation, switching, measurement reporting, location update, and the like. In the embodiments of the present application, a layer 3 signaling message used for the activation request above may be defined, or the activation request may be included in an existing layer 3 signaling message of any one of the foregoing functions, for example, included in a paging message. In this case, the method of this embodiment may further include:

S240. Receive, in response to the conversion from the sleep state to the active state, a paging message according to a paging parameter.

After converting from the sleep state to the active state, the slave device enters the normal working mode, that is, the slave device can listen, according to the paging parameter and at a particular time, on a channel associated with paging, and receive a paging message related to the slave device, so as to respond to a call to the slave device. For each slave device, a paging parameter thereof is known, including a parameter for determining information about a time at which the slave device receives a call from a base station, for example, an international mobile subscriber identity (IMSI) or a user equipment identification information, and a discontinuous reception (DRX) parameter configuration, which are all configured.

In another possible application scenario, the information associated with calling at least one slave device may also be an application layer message, which may be sent by a server in an IP network or sent by another user equipment that attempts to communicate with the slave device. For example, the application layer message is encapsulated in an IP packet. In this case, the method of this embodiment may further include:

S260. Acquire, from a base station of a home cell and in response to the conversion from the sleep state to the active state, a radio link resource associated with the call.

After converting from the sleep state to the active state, the slave device starts a process of establishing a channel, and acquires the radio link resource from the base station of the cell, so as to receive the application layer message delivered by the base station. A typical application scenario is Voice over Internet Protocol (VoIP) communication, where after establishing communication to the IP network by using the base station to which the slave device belongs, the slave device exchanges IP data with the other end of the VoIP communication.

In addition, still according to the description with reference to FIG. 1, in an implementation manner in which low-frequency and/or low-power-consumption communication is maintained between the master device and the slave device in a preset communications manner, the method of this embodiment further includes:

S280. Communicate, in the sleep state, with the master device by using a preset communications manner, where a clock rate and/or power consumption when communication is performed by using the preset communications manner is lower than a clock rate and/or power consumption corresponding to a state in which a receiving function of an air interface of the at least one slave device active.

A person skilled in the art may understand that, in the foregoing methods of the specific implementation manners of the present application, sequence numbers of steps do not mean execution sequences. The execution sequences of the steps should be determined according to functions and internal logic of the steps, and should not constitute any limitation on the implementation processes of the specific implementation manners of the present application.

In addition, an embodiment of the present application further provides a computer readable medium, including a computer readable instruction for performing the following operations when being executed: executing operations in the steps of the method in the implementation manner shown FIG. 1.

In addition, an embodiment of the present application further provides a computer readable medium, including a computer readable instruction for performing the following operations when being executed: executing operations in the steps of the method in the implementation manner shown FIG. 2.

FIG. 3(*a*) is a structural block diagram of an example of a call processing apparatus according to a first embodiment of the present application. The apparatus may belong to or may be any master device. In addition to the components that are described below, the apparatus may further include, as required, a communications module for implementing communication with any device outside the apparatus. As shown in FIG. 3(*a*), the apparatus 300 includes a first receiving module 320 and a first sending module 340.

The first receiving module 320 is configured to receive information associated with calling at least one slave device, where the information associated with calling at least one slave device is used to request to wake up the at least one slave device from a sleep state to an active state.

The sleep state includes: at least a receiving function of an air interface is disabled. The active state includes: at least the receiving function of the air interface is enabled.

Generally, in either a voice call or a data call, in order to receive a call message in time, the slave device keeps the receiving function of the air interface steady on or periodically enables the receiving function of the air interface to listen to the call message, where the call message includes a paging message (paging) sent by a base station or a core network device. The air interface means an interface for interaction between a called device and a calling device (including: a cellular base station, a WIFI AP, another user equipment, or the like) by means of wireless communications. Disabling/activating a receiving function of an air interface may be embodied as: turning off/on a radio frequency receiving function/state of a transceiver. In the method of this embodiment, to reduce power consumption caused by unnecessary listening by the slave device, the slave device is generally in a sleep state, that is, it is unnecessary to activate the receiving function of the air interface at intervals of a particular time (for example, a paging period). Each master device may establish a master-slave relationship with one or more slave devices in advance, and for a calling device, the master device may be known or unknown. Before or when calling the slave device, a caller device sends information associated with calling at least one slave device to at least the master device corresponding to the slave device or sends information associated with calling at least one slave device in such a manner as the corresponding master device can receive the information associated with calling at least one slave device, to trigger the slave device to convert from the sleep state to the active state. The first receiving module 320 receives such information, where such information includes any information used to indicate that the at least one slave device is going to be called, including the call message, which is equivalent to a wakeup request for converting the slave device from the sleep state to the active state, where the wakeup request may include identification information of the corresponding slave device (for example, and ID of the slave device), and the like, and may also include other information associated with calling the slave device, for example, a calling time when the call is going to occur.

The first sending module 340 is configured to send an excitation signal to the at least one slave device, where the excitation signal is used to wake up the at least one slave device.

In response to the reception of the information associated with calling at least one slave device, the first sending module 340 sends an excitation signal to the at least one slave device to wake up the corresponding slave device. According to a signal form acceptable to the slave device in the sleep state, the excitation signal may be a signal of any one or more of the following forms: sound, light, vibration, electric current, radio frequency, and the like.

In conclusion, in the apparatus in this embodiment, a slave device is rendered in a sleep state, and the slave device is activated when the slave device is being called or is going to be called, which can save power consumption caused by unnecessary listening by the slave device.

As described above, the apparatus of this embodiment may be used to activate the slave device when the slave device is being called or is going to be called. The call may include a voice call and may also include a data call. Correspondingly, according to different application scenarios, the information associated with calling at least one slave device may be a layer 3 signaling message (layer 3 message), which is sent by, for example, a base station or a core network device. Generally, the layer 3 signaling message mainly includes: paging, authentication, encryption, channel allocation, switching, measurement reporting, location update, and the like, and in the embodiments of the present application, a layer 3 signaling message used for the activation request above may be defined, or the activation request may be included in an existing layer 3 signaling message of any one of the foregoing functions, for example, included in a paging message. The information associated with calling at least one slave device may also be an application layer message, so that the master device can no longer wake up the slave device, where the application layer message may be sent by a server in an IP network or another user equipment that attempts to communicate with the slave device.

Figure 3A:
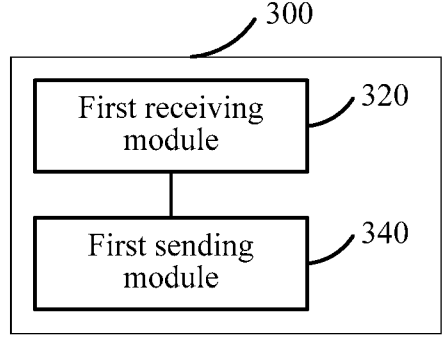
FIG. 3(a) to FIG. 3(d) are structural block diagrams of multiple examples of a call processing apparatus according to a first embodiment of the present application.
Figure 3B:
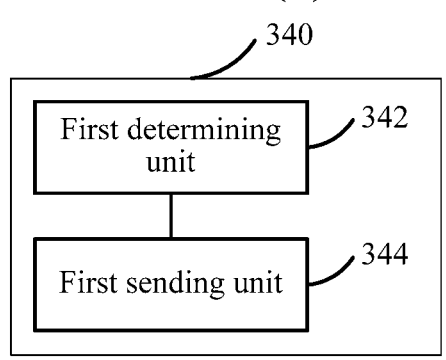

In addition, in some cases, although the master-slave relationship is determined, a communication link in the master-slave relationship may have been disrupted, where the communication link herein means a communication link that can satisfy transmitting and receiving of the excitation signal. For example, the communication link between the master device and the slave device is disrupted because a relative position relationship between the master device and the slave device changes, and in this case, the slave device is in a state of being unwakeable by the master device. Therefore, as shown in FIG. 3(b), in a possible implementation manner, the first sending module 340 may further include:

a first determining unit 342, configured to determine whether the at least one slave device is in a wakeable state, where the wakeable state means a state in which at least the excitation signal sent by the master device can be received in the sleep state; and a first sending unit 344, configured to send the excitation signal in response to that the at least one slave device is in the wakeable state.

Figure 3C:
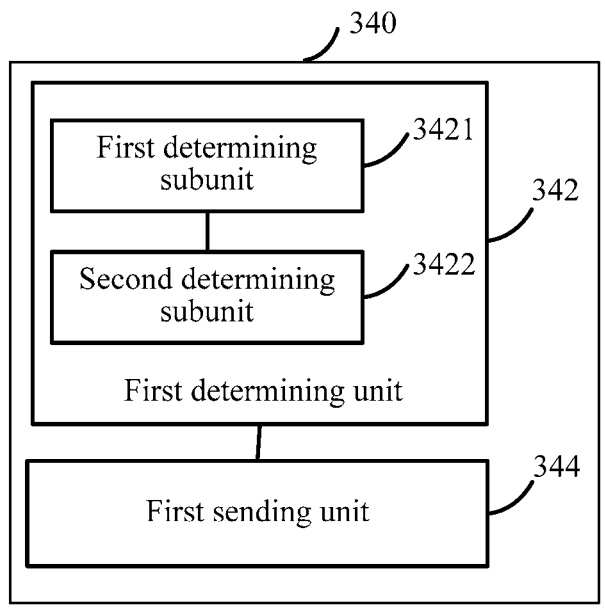

As shown in FIG. 3(c), the first determining unit 342 further includes: a first determining subunit 3421 and a second determining subunit 3422.

In a possible implementation manner, it may be determined, according to the relative position relationship between the master device and the slave device, whether the slave device is in the wakeable state. In this implementation manner, the first determining subunit 3421 is configured to determine a relative position of the at least one slave device.

The relative position means relative positions of the master device and the slave device. The relative position of the at least one slave device may be determined in any manner in which power consumption is lower than power consumption corresponding to a state in which the receiving function of the air interface is active. For example, a position of the slave device is fixed, and the relative positions of the slave device and the master device may be determined by determining a position of the master device.

The second determining subunit 3422 is configured to determine, in response to that the at least one slave device is located in a preset area, that the at least one slave device is in the wakeable state.

The preset area may be any suitable area in which the slave device can receive the excitation signal sent by the master device. If the at least one slave device is located in the preset area, it may be considered that the at least one slave device can be waken up by the master device.

In another possible implementation manner, whether a communication link exists between the master device and the slave device may be determined according to a usage state of the slave device. Specifically, the usage state may be: whether the slave device is used by a same user using the master device, and if yes, it may be considered that the slave device can be waken up by the master device. In this implementation manner, the first determining subunit 3421 is configured to determine a usage state of the at least one slave device.

Similarly, the usage state of the at least one slave device may be determined in any manner in which power consumption is lower than power consumption corresponding to a state in which the receiving function of the air interface is active. For example, it is determined, according to a driving signal from a possible sensor (for example, a sensor capable of collecting any data that identifies a feature of a user identity) on the slave device or another mechanical mechanism (for example, a wearing mechanism of a wearable device), that the slave device has been worn by a particular user (for example, the user of the master device).

The second determining subunit 3422 is configured to determine, according to the usage state, that the at least one slave device is in the wakeable state; and optionally, determine, in response to that the slave device is being used by a user of the master device, that the at least one slave device is in the wakeable state.

In still another possible implementation manner, a low-frequency and/or low-power-consumption communications relationship may be maintained between the master device and the slave device in a preset communications manner, where a clock rate and/or power consumption when the at least one slave device communicates by using the preset communications manner is lower than a clock rate and/or power consumption when the receiving function of the air interface of the at least one slave device is in the active state, and if this communications relationship exists continually, it is considered that the slave device is in the wakeable state; otherwise, the slave device is unwakeable. In this implementation manner, the first determining unit 342 may determine, in response to that the at least one slave device is capable of communicating by using a preset communications manner, that the at least one slave device is in the wakeable state.

It may be determined at any time, according to whether the master device can receive a reply that is sent by the slave device in the preset communications manner, whether the preset communications manner still exists between the master device and the slave device.

Figure 3D:
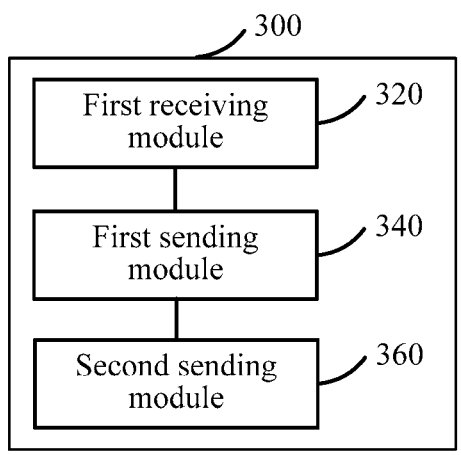

In addition, in the apparatus of this embodiment, the information associated with calling at least one slave device received by the first receiving module 320 may include time information associated with the call, representing a time at which a caller device calls the at least one slave device. In this implementation manner, the caller device may call the at least one slave device according to the time, for example, automatically calling the slave device after a period of time, no matter whether the corresponding slave device is waken up or not. In another possible implementation manner, in the method of this embodiment, a corresponding notification message may be sent after the excitation signal is sent or after the slave device is waken up, so that a caller can make a call more efficiently. In this implementation manner, as shown in FIG. 3(d), the apparatus 300 of this embodiment further includes:

a second sending module 360, configured to send a notification message associated with that the at least one slave device has been waken up.

For example, a notification message may be sent to a caller device or a base station of a cell to which the master device belongs.

In conclusion, the apparatus of this embodiment can avoid unnecessary power consumption of a slave device by means coordination with the master device.

FIG. 4 is a structural block diagram of an example of a call processing apparatus according to a second embodiment of the present application. The apparatus belongs to or is a slave device. As shown in FIG. 4, the apparatus 400 includes:

a second receiving module 420, configured to receive an excitation signal, where the excitation signal is sent by a master device in response to reception of information associated with calling a slave device, and the information associated with calling the slave device is used to request to wake up the slave device from a sleep state to an active state; and a state conversion module 440, configured to enable, in response to the reception of the excitation signal from the master device, the slave device to convert from the sleep state to the active state.

The sleep state includes: at least a receiving function of an air interface is disabled. The active state includes: at least the receiving function of the air interface is enabled.

According to the description with reference to FIG. 1, in the embodiments of the present application, the slave device is in the sleep state in a long term, and when needing to call the slave device, a calling device may send, to the master device, information associated with the call, to request to wake up the slave device from the sleep state to the active state. Alternatively, a call message from the calling device to the slave device may also be used to request to wake up the slave device from the sleep state to the active state. The master device sends the excitation signal to the corresponding slave device in response to the reception of the information associated with calling the slave device. The slave device converts from the sleep state to the active state in response to the reception of the excitation signal from the master device.

In conclusion, by means of the apparatus of this embodiment, when the slave device that is in the sleep state in a long term is called or is going to be called, the slave device is waken up by the master device, which can save power consumption caused by unnecessary listening by the slave device.

In the sleep state, a receiving function of an air interface of the slave device is disabled, but the slave device can still perform other operations, and power consumption of the operations performed should be lower than power consumption corresponding to a state in which the receiving function of the air interface is active. A working mode in the sleep state may be referred to as a low power consumption mode. For example, a high-level generating circuit may be designed to generate a high level when excited by an external excitation signal, to trigger the slave device to switch from the low power consumption mode to a normal working mode (the active state). In a possible implementation manner, the high level generating circuit includes a module, such as a series resistor and an acoustic sensor, whose electrical feature can be controlled by an external signal; in a normal situation, the module is in a high-resistance state, no current passes through the module, and the module does not consume power. When excited by a sound at a particular frequency, the acoustic sensor is in a low-resistance state, an electric current passes through the acoustic sensor, and a certain level difference can be generated on a resistor in series, where the level difference is used as a high level signal. The circuit may further include a passive frequency filter, which allows only a sound signal in a particular frequency range to pass, thereby reducing false triggering. The slave device may include an acoustic sensor, and according to different forms of the excitation signal, the slave device may further include other sensors excited by signals such as an optical signal, an electric current signal, a magnetic field signal, and a radio frequency signal. When waking up the save device, the master device sends an excitation signal that meets a particular feature (for example, a particular frequency and particular duration), so that the slave device switches from the sleep state to the active state.

Figure 4A:
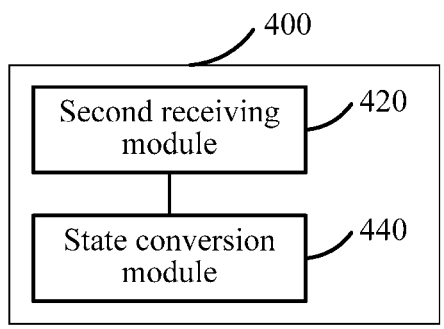
FIG. 4(*a*) to FIG. 4(*d*) are structural block diagrams of multiple examples of a call processing apparatus according to a second embodiment of the present application.
Figure 4B:
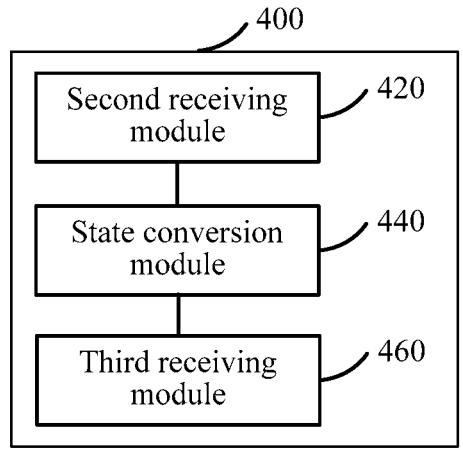

Still according to the description with reference to FIG. 1, the apparatus of this embodiment may be used to activate the slave device when the slave device is being called or is going to be called. The call may include a voice call, and may also include a data call. Correspondingly, in a possible application scenario, the information associated with calling at least one slave device may be a layer 3 signaling message, which is sent by, for example, a base station or a core network device. Generally, the layer 3 signaling message mainly includes: paging, authentication, encryption, channel allocation, switching, measurement reporting, location update, and the like. In the embodiments of the present application, a layer 3 signaling message used for the activation request above may be defined, or the activation request may be included in an existing layer 3 signaling message of any one of the foregoing functions, for example, included in a paging message. In this case, as shown in FIG. 4(b), the apparatus of this embodiment may further include:

a third receiving module 460, configured to receive, in response to the conversion from the sleep state to the active state, a paging message according to a paging parameter.

After converting from the sleep state to the active state, the slave device enters the normal working mode, that is, a function of the third receiving module 460 is activated, and the slave device can listen, according to the paging parameter and at a particular time, on a channel associated with paging, and receive a paging message related to the slave device, so as to respond to a call to the slave device. For each slave device, a paging parameter thereof is known, including a parameter for determining information about a time at which the slave device receives a call from a base station, for example, an international mobile subscriber identity (IMSI) or a user equipment identification information, and a discontinuous reception (DRX) parameter configuration, which are all configured.

Figure 4C:
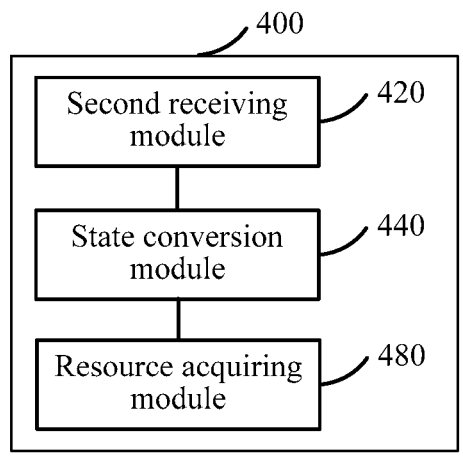

In another possible application scenario, the information associated with calling at least one slave device may also be an application layer message, which may be sent by a server in an IP network or sent by another user equipment that attempts to communicate with the slave device. In this case, as shown in FIG. 4(c), the apparatus of this embodiment may further include:

a resource acquiring module 480, configured to acquire, from a base station of a home cell and in response to the conversion from the sleep state to the active state, a radio link resource associated with the call.

After converting from the sleep state to the active state, the slave device starts a process of establishing a channel, and acquires the radio link resource from the base station of the cell by using the resource acquiring module 480, so as to receive the application layer message delivered by the base station. A typical application scenario is Voice over Internet Protocol (VoIP) communication, where after establishing communication to the IP network by using the base station to which the slave device belongs, the slave device exchanges IP data with the other end of the VoIP communication.

Figure 4D:
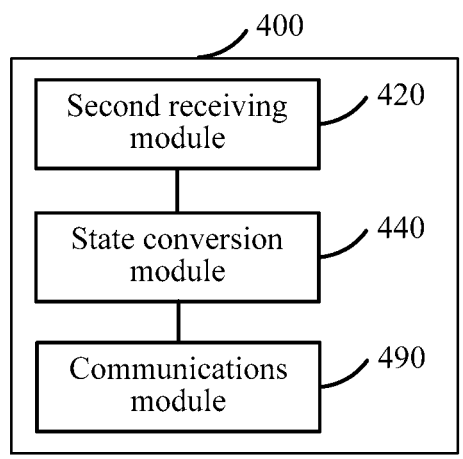

In addition, still according to the description with reference to FIG. 1, in an implementation manner in which low-frequency and/or low-power-consumption communication is maintained between the master device and the slave device in a preset communications manner, as shown in FIG. 4(d), the apparatus of this embodiment further includes:

a communications module 490, configured to communicate in the sleep state, with the master device by using a preset communications manner, where a clock rate and/or power consumption when communication is performed by using the preset communications manner is lower than a clock rate and/or power consumption corresponding to a state in which a receiving function of an air interface of the at least one slave device is active.

It should be noted that, all modules executing sending/receiving functions in each apparatus in the foregoing apparatus embodiments may be implemented as one module for executing the sending/receiving functions, or may be implemented as multiple independent modules executing corresponding sending/receiving functions.

The method and apparatus according to the embodiments of the present application are further described with reference to a specific instance.

An AP in a home of a user is a master device, and a smart meter B in the home is one of slave devices, where the meter B has a wireless communications capability and is in a sleep state. The user wants to remotely read data of the meter B by using a mobile phone C, and calls the meter B by using the mobile phone C; a base station of a cell in which the AP is located sends, by using a data transmission channel to the AP, a request, which is in a form of an application layer message, of waking up the meter B to the AP. The AP sends a sound (or a vibration, an ultrasonic wave, a radio frequency signal, or the like) of a particular frequency to activate the meter B, and sends, to the base station, a notification message indicating that the meter B has been activated. The meter B is waken up, and listens to a paging message related to the meter B. The base station establishes, in coordination, a radio bearer between the mobile phone C and the meter B.

Figure 5:
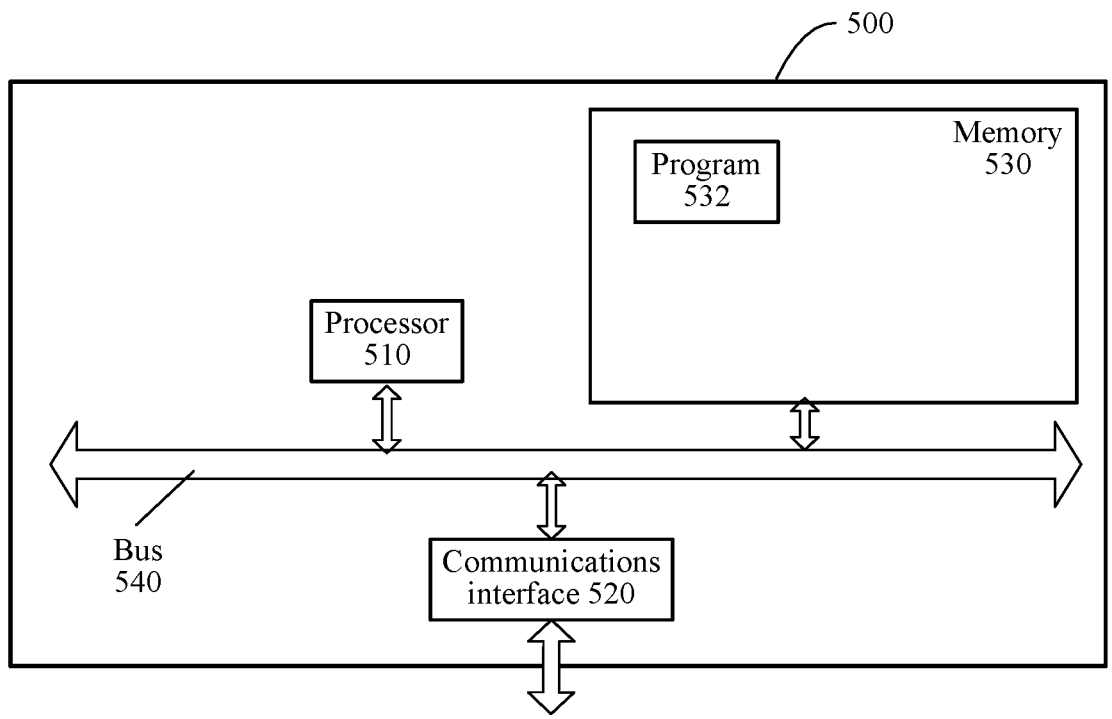
FIG. 5 is a structural block diagram of another example of a call processing apparatus according to a first embodiment of the present application.

FIG. 5 is a schematic structural diagram of still another example of a call processing apparatus according to a first embodiment of the present application, and a specific embodiment of the present application does not limit the specific implementation of the call processing apparatus. As shown in FIG. 5, the call processing apparatus 500 may include:

a processor 510, a communications interface 520, a memory 530, and a communications bus 540.

The processor 510, the communications interface 520, and the memory 530 complete mutual communication by using the communications bus 540.

The communications interface 520 is configured to communicate with a network element such as a client.

The processor 510 is configured to execute a program 532, and specifically may execute related steps in the foregoing method embodiment.

Specifically, the program 532 may include program code, and the program code includes a computer operation instruction.

The processor 510 may be a central processing unit (CPU) or an Application Specific Integrated Circuit (ASIC), or is configured as one or more integrated circuits for implementing the embodiments of the present application.

The memory 530 is configured to store the program 532. The memory 530 may include a high-speed read-only memory (RAM), or may further include a non-volatile memory, for example, at least one magnetic disk memory.

The program 532 may be specifically configured to enable the call processing apparatus 500 to execute the following steps:

receiving information associated with calling at least one slave device, where the information associated with calling at least one slave device is used to request to wake up the at least one slave device from a sleep state to an active state; and sending an excitation signal to the at least one slave device, where the excitation signal is used to request to wake up the at least one slave device.

For specific implementation of the steps in the program 532, refer to the corresponding description in the corresponding steps and units in the foregoing embodiments; details are not described herein again. A person skilled in the art may clearly understand that, for the convenience and conciseness of the description, for specific working processes of the device and modules described above, refer to the description of the corresponding processes in the foregoing method embodiment; details are not described herein again.

Figure 6:
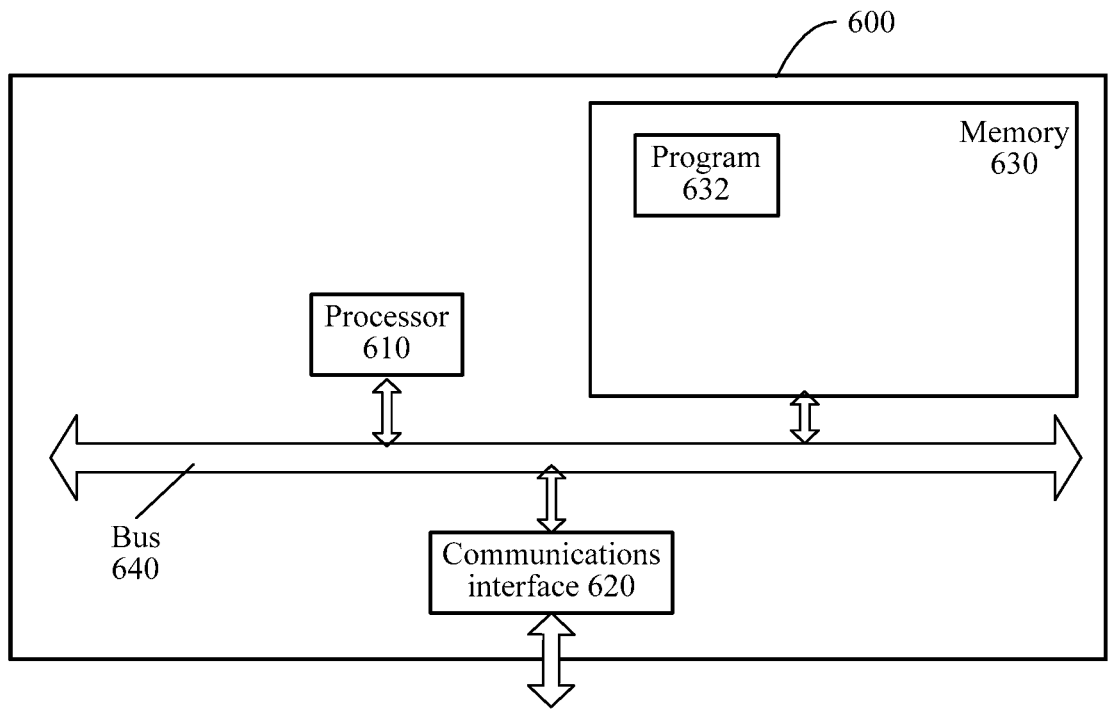
FIG. 6 is a structural block diagram of another example of a call processing apparatus according to a second embodiment of the present application.

FIG. 6 is a schematic structural diagram of still another example of a call processing apparatus according to a second embodiment of the present application, and a specific embodiment of the present application does not limit the specific implementation of the call processing apparatus. As shown in FIG. 6, the call processing apparatus 600 may include:

a processor 610, a communications interface 620, a memory 630, and a communications bus 640.

The processor 610, the communications interface 620, and the memory 630 complete mutual communication by using the communications bus 640.

The communications interface 620 is configured to communicate with a network element such as a client.

The processor 610 is configured to execute a program 632, and specifically may execute related steps in the foregoing method embodiment.

Specifically, the program 632 may include program code, and the program code includes a computer operation instruction.

The processor 610 may be a central processing unit (CPU) or an Application Specific Integrated Circuit (ASIC), or is configured as one or more integrated circuits for implementing the embodiments of the present application.

The memory 630 is configured to store the program 632. The memory 630 may include a high-speed RAM, or may further include a non-volatile memory, for example, at least one magnetic disk memory. The program 632 may be specifically configured to enable the call processing apparatus 600 to execute the following steps:

receiving an excitation signal, where the excitation signal is sent by a master device in response to reception of information associated with calling a slave device, and the information associated with calling the slave device is used to request to wake up the slave device from a sleep state to an active state; and enabling, in response to the reception of the excitation signal, the slave device to convert from the sleep state to the active state.

For specific implementation of the steps in the program 632, refer to the corresponding description in the corresponding steps and units in the foregoing embodiments; details are not described herein again. A person skilled in the art may clearly understand that, for the convenience and conciseness of the description, for specific working processes of the device and modules described above, refer to the description of the corresponding processes in the foregoing method embodiment; details are not described herein again.

A person skilled in the art may clearly understand that, for the convenience and conciseness of the description, for specific working processes of the device and modules described above, refer to the description of the corresponding processes in the foregoing apparatus embodiment; details are not described herein again.

Although the subject matter is described herein in the general context of program modules that execute in conjunction with an application program that runs on an operating system on a computer system, a person skilled in the art will recognize that the invention may also be implemented in combination with other types of program modules. Generally, program modules comprise routines, programs, components, data structures and other types of structures that perform particular tasks or implement particular abstract data types. It can be understood by a person skilled in the art that the invention described herein may be practiced with other computer system configurations, comprising handheld devices, multiprocessor systems, microprocessor-based or programmable consumer electronics, minicomputers, mainframe computers, and so on, and may also be practiced in distributed computing environments where tasks are performed by remote processing devices linked through a communications network. In a distributed computing environment, program modules may be located in both local and remote memory storage devices.

It can be appreciated by a person of ordinary skill in the art that, exemplary units and method steps described with reference to the embodiments disclosed in this specification can be implemented by electronic hardware or a combination of computer software and electronic hardware. Whether these functions are executed by hardware or software depends on specific applications and design constraints of the technical solution. A person skilled in the art may use different methods to implement the described functions for each specific application, but such implementation should not be construed as a departure from the scope of the present application.

If the function is implemented in the form of a software functional unit and is sold or used as an independent product, the product can be stored in a computer-readable storage medium. Based on this understanding, the technical solution of the present application essentially, or the part that contributes to the prior art, or a part of the technical solution may be embodied in the form of a software product; the computer software product is stored in a storage medium and comprises several instructions for enabling a computer device (which may be a personal computer, a server, a network device, or the like) to execute all or some of the steps of the method in the embodiments of the present application. The foregoing computer-readable storage medium comprises physical volatile and non-volatile, removable and non-removable mediums that are implemented in any method or technology for storage of information such as computer-readable instructions, data structures, program modules or other data. The computer-readable storage medium specifically comprises, but is not limited to, a USB flash drive, a removable hard disk, a read-only memory (ROM), a random access memory (RAM), an erasable programmable read-only memory (EPROM), an electrically erasable programmable read-only memory (EEPROM), a flash memory or other solid-state memory technology, a CD-ROM, a digital versatile disc (DVD), an HD-DVD, a Blue-ray disc or other optical storage devices, a magnetic tape, magnetic disk storage or other magnetic storage devices, or any other medium that can be used for storing required information and can be accessed by a computer.

The foregoing implementations are only used to describe the present invention, but not to limit the present invention. A person of ordinary skill in the art can still make various alterations and modifications without departing from the spirit and scope of the present invention; therefore, all equivalent technical solutions also fall within the scope of the present application, and the patent protection scope of the present application should be subject to the claims.

What is claimed is:

1. A call processing method, comprising:
receiving information associated with calling at least one slave device, wherein the information associated with calling at least one slave device is used to request to wake up the at least one slave device from a sleep state to an active state; and
sending an excitation signal to the at least one slave device, wherein the excitation signal is used to wake up the at least one slave device;
wherein the excitation signal is used to excite a high-level generating circuit in the at least one slave device to generate a high level signal to trigger the at least one slave device to switch from the sleep state to the active state; and
wherein the sending the excitation signal to the at least one slave device comprises:
determining whether the at least one slave device is capable of communicating by using a preset communications manner, and determining whether a master device can receive a reply that is sent by the slave device in the preset communications manner, wherein the slave device is determined to be capable of communicating by using the preset communications manner when a clock rate or power consumption of the slave device communicating by using the preset communications manner is lower than a clock rate or power consumption corresponding to a state in which a receiving function of an air interface of the at least one slave device is active;
determining, in response to that the at least one slave device is capable of communicating by using the preset communications manner, that the at least one slave device is in a wakeable state; and
sending the excitation signal in response to that the at least one slave device is in the wakeable state;
wherein determining whether the at least one slave device is in the wakeable state further comprises:
determining whether the slave device and the master device are used by a same user; and
if the slave device and the master device are used by the same user, determining that the at least one slave device is in the wakeable state.

2. The method of claim 1, wherein
the sleep state comprises: at least the receiving function of the air interface is disabled; and
the active state comprises: at least the receiving function of the air interface is enabled.

3. The method of claim 1, wherein the determining whether the at least one slave device is in a wakeable state comprises:
determining a relative position of the at least one slave device; and determining, in response to that the at least one slave device is located in a preset area, that the at least one slave device is in the wakeable state.

4. The method of claim 1, wherein the determining whether the at least one slave device is in a wakeable state comprises:
determining a usage state of the at least one slave device; and
determining, according to the usage state, that the at least one slave device is in the wakeable state.

5. The method of claim 1, further comprising:
sending a notification message associated with that the at least one slave device has been wakened up.

6. The method of claim 1, wherein the information associated with calling at least one slave device is a layer 3 signaling message.

7. The method of claim 1, wherein the information associated with calling at least one slave device is an application layer message.

8. The method of claim 1, wherein the excitation signal comprises a signal of at least one of the following forms: a sound signal, an optical signal, a vibration signal, an electric current signal, and a radio frequency signal.

9. A call processing method, comprising:
receiving an excitation signal, wherein the excitation signal is sent by a master device in response to reception of information associated with calling a slave device, and the information associated with calling the slave device is used to request to wake up the slave device from a sleep state to an active state;
enabling, in response to the reception of the excitation signal, the slave device to convert from the sleep state to the active state, wherein a high-level generating circuit in the slave device is configured to generate a high level signal when excited by the excitation signal to trigger the slave device to switch from the sleep state to the active state;
determining whether the slave device is capable of communicating by using a preset communications manner, and determining whether the master device can receive a reply that is sent by the slave device in the preset communications manner, wherein the slave device is determined to be capable of communicating by using the preset communications manner when a clock rate or power consumption of the slave device communicating by using the preset communications manner is lower than a clock rate or power consumption corresponding to a state in which a receiving function of an air interface of the at least one slave device is active;
communicating, in the sleep state, with the master device by using the preset communications manner;
determining whether the slave device and the master device are used by a same user; and
if the slave device and the master device are used by the same user, determining that the at least one slave device is in a wakeable state.

10. The method of claim 9, wherein
the sleep state comprises: at least the receiving function of the air interface is disabled; and
the active state comprises: at least the receiving function of the air interface is enabled.

11. The method of claim 9, wherein the method further comprises:
receiving, in response to the conversion from the sleep state to the active state, a paging message according to at least one paging parameter.

12. The method of claim 9, further comprising:
acquiring, from a base station of a home cell and in response to the conversion from the sleep state to the active state, a radio link resource associated with the call.

13. The method of claim 12, wherein the excitation signal comprises a signal of at least one of the following forms: a sound signal, an optical signal, a vibration signal, an electric current signal, and a radio frequency signal.

14. The method of claim 9, wherein the information associated with calling at least one slave device is a layer 3 signaling message.

15. The method of claim 9, wherein the information associated with calling at least one slave device is an application layer message.

16. A non-transitory computer-readable storage medium configured with instructions which, when executed by one or more processors, cause the one or more processors to perform operations comprising:
receiving information associated with calling at least one slave device, wherein the information associated with calling at least one slave device is used to request to wake up the at least one slave device from a sleep state to an active state; and
sending an excitation signal to the at least one slave device, wherein the excitation signal is used to wake up the at least one slave device;
wherein the excitation signal is used to excite a high-level generating circuit in the at least one slave device to generate a high level signal to trigger the at least one slave device to switch from the sleep state to the active state; and
wherein the sending the excitation signal to the at least one slave device comprises:
determining whether the at least one slave device is capable of communicating by using a preset communications manner, and determining whether a master device can receive a reply that is sent by the slave device in the preset communications manner, wherein the slave device is determined to be capable of communicating by using the preset communications manner when a clock rate or power consumption of the slave device communicating by using the preset communications manner is lower than a clock rate or power consumption corresponding to a state in which a receiving function of an air interface of the at least one slave device is active;
determining, in response to that the at least one slave device is capable of communicating by using the preset communications manner, that the at least one slave device is in a wakeable state; and
sending the excitation signal in response to that the at least one slave device is in the wakeable state;
wherein determining whether the at least one slave device is in the wakeable state further comprises:
determining whether the slave device and the master device are used by a same user; and
if the slave device and the master device are used by the same user, determining that the at least one slave device is in the wakeable state.

17. A call processing apparatus, comprising:
a transceiver, configured to receive information associated with calling at least one slave device, wherein the information associated with calling at least one slave device is used to request to wake up the at least one slave device from a sleep state to an active state, and send an excitation signal to the at least one slave device, wherein the excitation signal is used to request to wake up the at least one slave device;
a memory, configured to store an instruction; and
a processor, configured to execute the instruction stored in the memory to perform operations including:
sending, by using the transceiver and in response to the transceiver receiving the information associated with calling at least one slave device, an excitation signal to the at least one slave device;
wherein the excitation signal is used to excite a high-level generating circuit in the at least one slave device to generate a high level signal to trigger the at least one slave device to switch from the sleep state to the active state; and
wherein sending the excitation signal to the at least one slave device comprises:
determining whether the at least one slave device is capable of communicating by using a preset communications manner, and determining whether a master device can receive a reply that is sent by the slave device in the preset communications manner, wherein the slave device is determined to be capable of communicating by using the preset communications manner when a clock rate or power consumption of the slave device communicating by using the preset communications manner is lower than a clock rate or power consumption corresponding to a state in which a receiving function of an air interface of the at least one slave device is active;
determining, in response to that the at least one slave device is capable of communicating by using the preset communications manner, that the at least one slave device is in a wakeable state; and
sending the excitation signal in response to that the at least one slave device is in the wakeable state;
wherein determining whether the at least one slave device is in the wakeable state further comprises:
determining whether the slave device and the master device are used by a same user; and
if the slave device and the master device are used by the same user, determining that the at least one slave device is in the wakeable state.

18. The apparatus of claim 17, wherein the operations further comprise:
determining a relative position of the at least one slave device; and
in response to that the at least one slave device is located in a preset area, determining that the at least one slave device is in the wakeable state.

19. The apparatus of claim 17, wherein the operations further comprise:
determining a usage state of the at least one slave device; and
according to the usage state, determining that the at least one slave device is in the wakeable state.

20. The apparatus of claim 17, wherein the operations further comprise:
sending a notification message associated with that the at least one slave device has been wakened up.

21. A non-transitory computer-readable storage medium configured with instructions which, when executed by one or more processors, cause the one or more processors to perform operations comprising:
receiving an excitation signal, wherein the excitation signal is sent by a master device in response to reception of information associated with calling a slave device, and the information associated with calling the slave device is used to request to wake up the slave device from a sleep state to an active state;
in response to the reception of the excitation signal, enabling the slave device to convert from the sleep state to the active state, wherein a high-level generating circuit in the slave device is configured to generate a high level signal when excited by the excitation signal to trigger the slave device to switch from the sleep state to the active state;
determining whether the slave device is capable of communicating by using a preset communications manner, and determining whether the master device can receive a reply that is sent by the slave device in the preset communications manner, wherein the slave device is determined to be capable of communicating by using the preset communications manner when a clock rate or power consumption of the slave device communicating by using the preset communications manner is lower than a clock rate or power consumption corresponding to a state in which a receiving function of an air interface of the at least one slave device is active;
in the sleep state, communicating with the master device by using the preset communications manner;
determining whether the slave device and the master device are used by a same user; and
if the slave device and the master device are used by the same user, determining that the at least one slave device is in a wakeable state.

22. A call processing apparatus, comprising:
a transceiver, configured to receive an excitation signal, wherein the excitation signal is sent by a master device in response to reception of information associated with calling a slave device, and the information associated with calling the slave device is used to request to wake up the slave device from a sleep state to an active state and respond to the reception of the excitation signal;
a memory, configured to store an instruction; and
a processor, configured to execute the instruction stored in the memory to perform operations including:
controlling, in response to the transceiver receiving the excitation signal, the slave device to wake up from the sleep state to the active state, wherein a high-level generating circuit in the slave device is configured to generate a high level signal when excited by the excitation signal to trigger the slave device to switch from the sleep state to the active state;
determining whether the slave device is capable of communicating by using a preset communications manner, and determining whether the master device can receive a reply that is sent by the slave device in the preset communications manner, wherein the slave device is determined to be capable of communicating by using the preset communications manner when a clock rate or power consumption of the slave device communicating by using the preset communications manner is lower than a clock rate or power consumption corresponding to a state in which a receiving function of an air interface of the at least one slave device is active;
communicating, in the sleep state, with the master device by using the preset communications manner;
determining whether the slave device and the master device are used by a same user; and
if the slave device and the master device are used by the same user, determining that the at least one slave device is in a wakeable state.

23. The apparatus of claim 22, wherein the operations further comprise:
   in response to the conversion from the sleep state to the active state, receiving a paging message according to at least one paging parameter.

24. The apparatus of claim 22, wherein the operations further comprise:
   from a base station of a home cell and in response to the conversion from the sleep state to the active state, acquiring a radio link resource associated with the call.

* * * * *